US012737667B2

(12) United States Patent
O'Keeffe et al.

(10) Patent No.: US 12,737,667 B2
(45) Date of Patent: Sep. 15, 2026

(54) DETERMINING CANDIDATES FOR CIRCUIT BREAKER PATTERNS IN CLOUD APPLICATIONS USING MACHINE LEARNING TECHNIQUES

(71) Applicant: Dell Products L.P., Round Rock, TX (US)

(72) Inventors: Derek O'Keeffe, Cork (IE); Jordan Daly, Mullingar (IE); David Ahern, Ballincollig (IE)

(73) Assignee: Dell Products L.P., Round Rock, TX (US)

( * ) Notice: Subject to any disclaimer, the term of this patent is extended or adjusted under 35 U.S.C. 154(b) by 1212 days.

(21) Appl. No.: 17/378,348

(22) Filed: Jul. 16, 2021

(65) Prior Publication Data

US 2023/0013075 A1 Jan. 19, 2023

(51) Int. Cl.
*G06F 11/34* (2006.01)
*G06F 11/07* (2006.01)
(Continued)

(52) U.S. Cl.
CPC ......... *G06N 20/00* (2019.01); *G06F 11/0793* (2013.01); *G06F 11/3447* (2013.01);
(Continued)

(58) Field of Classification Search
CPC .. G06F 11/302; G06F 11/0793; G06F 11/079; G06F 11/3447; H04L 41/0654
See application file for complete search history.

(56) References Cited

U.S. PATENT DOCUMENTS

2023/0033681 A1* 2/2023 Hulick, Jr. .............. G06F 9/541
2023/0090079 A1* 3/2023 Bruno ..................... G06F 8/423
717/170

(Continued)

OTHER PUBLICATIONS

Microsoft, Circuit Breaker Pattern, https://docs.microsoft.com/en-us/azure/architecture/patterns/circuit-breaker , Jun. 23, 2017.

*Primary Examiner* — Yolanda L Wilson
(74) *Attorney, Agent, or Firm* — Ryan, Mason & Lewis, LLP

(57) ABSTRACT

Methods, apparatus, and processor-readable storage media for determining candidates for circuit breaker patterns in cloud applications using machine learning techniques are provided herein. An example computer-implemented method includes obtaining consumption-related data from first cloud-based applications; obtaining production-related data from second cloud-based applications; training at least one machine learning-based classifier using at least a portion of the consumption-related data; determining composition of one or more cloud-based application programming interfaces by processing at least a portion of the production-related data using the at least one trained machine learning-based classifier; determining one or more candidates, within one or more portions of the one or more cloud-based application programming interfaces, for implementation of at least one circuit breaker pattern based at least in part on the determined composition of the one or more cloud-based application programming interfaces; and performing automated actions based at least in part on the determined candidates.

20 Claims, 15 Drawing Sheets

(51) Int. Cl.
*G06F 11/36* (2006.01)
*G06N 20/00* (2019.01)
*H04L 67/10* (2022.01)
*G06F 11/362* (2025.01)

(52) U.S. Cl.
CPC .............. *G06F 11/36* (2013.01); *H04L 67/10* (2013.01); *G06F 11/362* (2013.01)

(56) References Cited

U.S. PATENT DOCUMENTS

2023/0385143 A1* 11/2023 Mohanty ............. G06F 11/0751
2024/0070048 A1* 2/2024 Chatterjee ............. G06F 11/302

* cited by examiner

```
input_data = {}

for filename in glob.glob('in/*.json'):
        with open(filename) as f:
                svc = re.search('in/(.+?)-', filename).group(1)
                if svc not in input_data:
                        input_data[svc] = []
                input_data[svc].append(json.load(f))
```

300

```
def flatten(d, label='', collector=[]):
    if isinstance(d, list):
        for v in d:
            flatten(v, label, collector)
    elif isinstance(d, dict):
        for k, v in d.items():
            flatten(v, label+'.'+k, collector)
    else:
        label = label[1:] if label.startswith('.') else label
        collector.append((label,d))

def group_by_service(keys_values):
    result = {}
    for k,v in keys_values:
        key_parts = k.split('.')
        service_name, prop = key_parts[0], key_parts[-1]
        if service_name not in result:
            result[service_name] = []
        result[service_name].append(f'{v}')
        #result[service_name].append(f'{prop} : {v}')
    return result

collector = []
    flatten(input_data, '', collector)
    transformed_data_grouped_by_service = group_by_service(collector)
```

```
transformed_data_grouped_by_service['tenant'][7:11]

['12yy621', 'jake.xxxxx1@yyy.com', 'Jake', 'xxxxx1']

# Convert to a sklearn Bunch before we train. Needs data, target, target_names
data = []
target = []
target_names = []
for service_name in transformed_data_grouped_by_service.keys():
        service_data = transformed_data_grouped_by_service[service_name]
        target_names.append(service_name)
        target.extend([len(target_names)-1] * len(service_data))
        data.extend(service_data)
training_data = Bunch(data=data, target=target, target_names=target_names)
```

FIG. 5

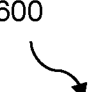

```
from sklearn.feature_extraction.text import CountVectorizer
count_vect = CountVectorizer()
X_train_counts = count_vect.fit_transform(training_data.data)
X_train_counts.shape

from sklearn.feature_extraction.text import TfidfTransformer
tf_transformer = TfidfTransformer(use_idf=False).fit(X_train_counts)
X_train_tf = tf_transformer.transform(X_train_counts)

tfidf_transformer = TfidfTransformer()

X_train_tfidf = tfidf_transformer.fit_transform(X_train_counts)

# Train
from sklearn.naive_bayes import MultinomialNB
clf = MultinomialNB().fit(X_train_tfidf, training_data.target)
```

FIG. 6

```
# Predict
testing_sample = [
        'Package "CUP/40/SomeFilePath Here not found and can not be published: /var/
        ,/vcap/data/fdsfdsfds-f0b1-xxxx-fdsfd-fsdfdsfds/CUP/tus/uploads/
        /c2960417-9d32-yy2b-9c26-74fyy192c3ea/data',
        'PUBLISHING',
        'Jordan ZZZZ']
X_new_counts = count_vect.transform(testing_sample)
X_new_tfidf = tfidf_transformer.transform(X_new_counts)

predicted = clf.predict(X_new_tfidf)

for doc, category in zip(testing_sample, predicted):
        print('%r => %s' % (doc, training_data.target_names[category]))

'Package "CUP/40/SomeFilePath Here not found and can not be published:
        /var/vcap/data/fdsfdsfds-f0b1-xxxx-fdsfdfsdfdsfds/
        CUP/tus/uploads/c2960417-9d32-yy2b-9c26-74fyy192c3ea/data' => sua
        'PUBLISHING' => sup
        'Jordan ZZZZ' => tenant
```

```
with open('out/packages.json') as f:
        data_provided_by_microservice = json.load(f)

test_data = []
test_data_field_names = []
test_data_fields = []
flatten(data_provided_by_microservice, '', test_data_fields)
for test_data_field in test_data_fields:
        if test_data_field[1] is not None:
                test_data.append(f'{test_data_field[1]}')
                test_data_field_names.append(f'{test_data_field[0]}')

X_new_counts = count_vect.transform(test_data)
X_new_tfidf = tfidf_transformer.transform(X_new_counts)

predicted = clf.predict(X_new_tfidf)

stats = {}
field_stats = {}
for output_data_field_name, output_data_field, predicted_upstream_service in□
        ,/zip(test_data_field_names, test_data, predicted):
                predicted_service_name = training_data.
        /target_names[predicted_upstream_service]
                if predicted_service_name not in stats:
                        stats[predicted_service_name] = 0
                stats[predicted_service_name] += 1
                if predicted_service_name not in field_stats:
                        field_stats[predicted_service_name] = set()
                field_stats[predicted_service_name].add(output_data_field_name)
```

FIG. 8

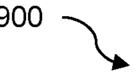

field_stats

```
{'sup': {'compatibility.versions.id’,
         'compatibility.versions.version’,
         'createdBy’,
         'createdDate’,
         'environment.raw’,
         'environment.text’,
         'files.filename’,
         'files.id’,
         'files.size’,
         'id’,
         'name’,
         'publishedBy’,
         'publishing.info’,
         'publishing.percent’,
         'publishing.status’,
         'releaseDate’,
         'releaseNoteLink’,
         'rule.id’,
         'rule.recommendationCount’,
         'state’,
         'type.raw’,
         'type.text’,
         'urgent’,
         'valueProposition’,
         'version'},
'tenant': {'createdBy', 'publishedBy'},
'sua': {'publishing.info'}}
```

FIG. 9

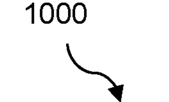

```
stats = {}
for output_data_field_name, output_data_field, predicted_upstream_service in□
            ,/zip(test_data_field_names, test_data, predicted):
                        predicted_service_name = training_data.
            ,/target_names[predicted_upstream_service]
                        if predicted_service_name not in stats:
                                    stats[predicted_service_name] = {}
                        if output_data_field_name not in stats[predicted_service_name]:
                                    stats[predicted_service_name][output_data_field_name] = set()
                        stats[predicted_service_name][output_data_field_name].add(output_data_field)

import pandas as pd

df = pd.DataFrame(columns=['field', 'service', 'distict_values'])
for svc, fields in stats.items():
            for field, values in fields.items():

                        df = df.append({'field': field, 'service': svc, 'distict_values':□
            ,/len(values)},ignore_index=True)

df
```

```
field service distict_values
        0 id sup 14
        1 version sup 14
        2 name sup 12
        3 type.raw sup 3
        4 type.text sup 3
        5 releaseDate sup 7
        6 urgent sup 2
        7 environment.raw sup 2
        8 environment.text sup 2
        9 state sup 5
        10 releaseNoteLink sup 4
        11 valueProposition sup 11
        12 createdDate sup 13
        13 compatibility.versions.id sup 11
        14 compatibility.versions.version sup 11
        15 files.id sup 11
        16 files.filename sup 9
        17 files.size sup 9
        18 rule.id sup 12
        19 rule.recommendationCount sup 5
        20 publishing.percent sup 2
        21 publishing.status sup 2
        22 publishing.info sup 1
        23 createdBy sup 2
        24 publishedBy sup 1
        25 createdBy tenant 3
        26 publishedBy tenant 5
        27 publishing.info sua 5
```

```
# pivoted = df.pivot("field", "service", "distict_values")
import numpy as np
from matplotlib import pyplot as plt

sns.set_theme()
sns.set_style("whitegrid")
pivoted = df.pivot_table(values='distict_values', index=['field'],
                    columns=['service'], aggfunc=np.sum, fill_value=np.nan)

f, ax = plt.subplots(figsize=(12,13))

sns.heatmap(pivoted, annot=True, linewidths=.75, ax=ax, cmap="vlag").
                    ,!set(title='Composition of CUP Package API fields', xlabel='Consumed service□
                    ,!name', ylabel='Produced API field names')
[Text(0.5, 1.0, 'Composition of CUP Package API fields'),
Text(0.5, 93.5, 'Consumed service name'),
Text(84.4999zzzz999999, 0.5, 'Produced API field names')]
```

FIG. 10C

DETERMINING CANDIDATES FOR CIRCUIT BREAKER PATTERNS IN CLOUD APPLICATIONS USING MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to application management using such systems.

BACKGROUND

A circuit breaker is a pattern used to increase the resiliency of cloud native applications. For example, a circuit breaker can commonly serve as a fallback implementation that gets triggered when an upstream service and/or application programming interface (API) fails or becomes unresponsive. However, conventional application management approaches present problems in identifying circuit breaker patterns in applications and/or specific portions thereof. Such approaches typically involve issue debugging, a reactive process that is often time-consuming and resource-intensive, and which also results in downtime for the application(s) in question.

SUMMARY

Illustrative embodiments of the disclosure provide techniques for determining candidates for circuit breaker patterns in cloud applications using machine learning techniques. An exemplary computer-implemented method includes obtaining consumption-related data from one or more first cloud-based applications, and obtaining production-related data from one or more second cloud-based applications. The method also includes training at least one machine learning-based classifier using at least a portion of the consumption-related data from the one or more first cloud-based applications, and determining composition of one or more cloud-based application programming interfaces by processing at least a portion of the production-related data from the one or more second cloud-based applications using the at least one trained machine learning-based classifier. Further, the method additionally includes determining one or more candidates, within one or more portions of the one or more cloud-based application programming interfaces, for implementation of at least one circuit breaker pattern based at least in part on the determined composition of the one or more cloud-based application programming interfaces, and performing one or more automated actions based at least in part on the one or more determined candidates.

Illustrative embodiments can provide significant advantages relative to conventional application management approaches. For example, problems associated with time-consuming and resource-intensive reactive issue debugging processes are overcome in one or more embodiments through automatically and proactively determining candidates for circuit breaker patterns in cloud applications using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 3 shows an example code snippet for transforming input data in an illustrative embodiment.

FIG. 5 shows an example code snippet for implementing more granular identification of transformed data in an illustrative embodiment.

FIG. 6 shows an example code snippet for training a classifier in an illustrative embodiment.

FIG. 7 shows an example code snippet for predicting the composition of one or more fields of an API in an illustrative embodiment.

FIG. 8 shows an example code snippet for classifying testing data in an illustrative embodiment.

FIG. 9 shows an example code snippet for generating a classification output in an illustrative embodiment.

FIG. 10A through FIG. 10C show example code snippets for generating a visualization output in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
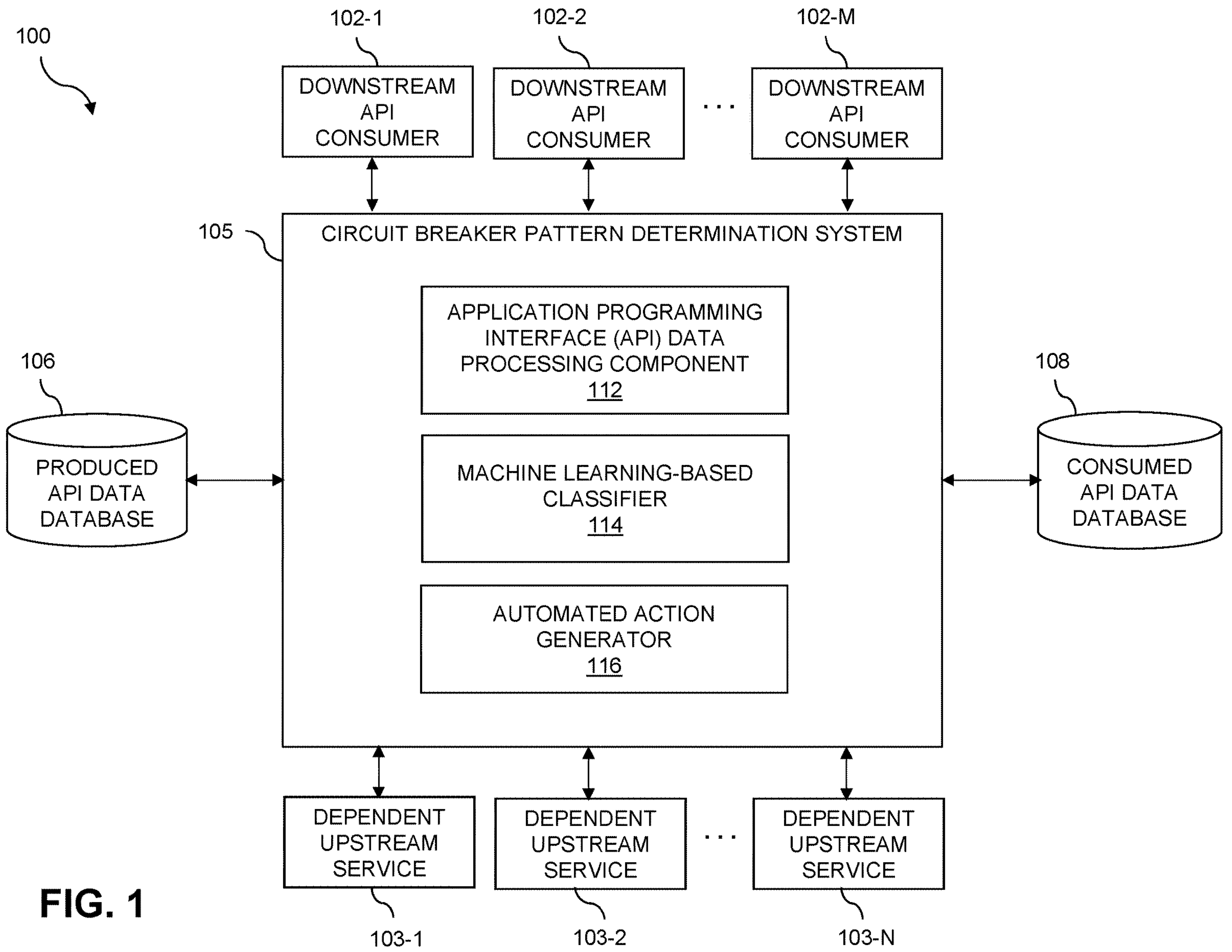
FIG. 1 shows an information processing system configured for determining candidates for circuit breaker patterns in cloud applications using machine learning techniques in an illustrative embodiment.

FIG. 1 shows a computer network (also referred to herein as an information processing system) 100 configured in accordance with an illustrative embodiment. The computer network 100 comprises a plurality of downstream API consumers 102-1, 102-2, . . . 102-M, collectively referred to herein as downstream API consumers 102. As also depicted in FIG. 1, the computer network 100 comprises a plurality of dependent upstream services 103-1, 103-2, . . . 103-N, collectively referred to herein as dependent upstream services 103. The downstream API consumers 102 and dependent upstream services 103 are coupled to a network, wherein the network in this embodiment is assumed to represent a sub-network or other related portion of the larger computer network 100. Also coupled to the network is circuit breaker pattern determination system 105.

The downstream API consumers 102 may comprise, for example, mobile telephones, laptop computers, tablet computers, desktop computers or other types of computing devices (e.g., which utilize data and/or resources from other applications, servers, upstream services, etc.). Such devices are examples of what are more generally referred to herein as "processing devices." Some of these processing devices are also generally referred to herein as "computers." Additionally or alternatively, the downstream API consumers 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The dependent upstream services 103 may comprise, for example, distinct services for product information, sales and/or shopping cart information, user information, etc. By way of further example, in one or more embodiments, information from different dependent upstream services 103 can be combined by and/or into one API to provide information for a grid view of product-sales information by users. Accordingly, in such an embodiment, dependent upstream services 103 can include services that provide data for a narrower domain and/or specific information context.

Also, it is to be appreciated that the term "user" in this context and elsewhere herein is intended to be broadly construed so as to encompass, for example, human, hardware, software or firmware entities, as well as various combinations of such entities.

Such a network as described above and further herein can be assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, circuit breaker pattern determination system 105 can have an associated produced API data database 106 configured to store information pertaining to data produced in one or more APIs, which comprise, for example, representation state transfer (REST) resource names, field names, etc. Also, circuit breaker pattern determination system 105 can have an associated consumed API data database 108 configured to store information pertaining to data consumed by one or more microservices (e.g., dependent upstream services 103), which comprise, for example, upstream service names, REST resource names, fields, data related to one or more requests, etc.

The produced API data database 106 and the consumed API data database 108 in the present embodiment are implemented using one or more storage systems associated with circuit breaker pattern determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with circuit breaker pattern determination system 105 are one or more input-output devices, which illustratively comprise keyboards, displays or other types of input-output devices in any combination. Such input-output devices can be used, for example, to support one or more user interfaces to circuit breaker pattern determination system 105, as well as to support communication between circuit breaker pattern determination system 105 and other related systems and devices not explicitly shown.

Additionally, circuit breaker pattern determination system 105 in the FIG. 1 embodiment is assumed to be implemented using at least one processing device. Each such processing device generally comprises at least one processor and an associated memory, and implements one or more functional modules for controlling certain features of circuit breaker pattern determination system 105.

More particularly, circuit breaker pattern determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows circuit breaker pattern determination system 105 to communicate over a network with the downstream API consumers 102 and dependent upstream services 103, and illustratively comprises one or more conventional transceivers.

The circuit breaker pattern determination system 105 further comprises API data processing component 112, machine learning-based classifier 114, and automated action generator 116.

It is to be appreciated that this particular arrangement of elements 112, 114 and 116 illustrated in the circuit breaker pattern determination system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically determining candidates for circuit breaker patterns in cloud applications involving downstream API consumers 102 and dependent upstream services 103 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of circuit breaker pattern determination system 105, produced API data database 106, and consumed API data database 108 can be on and/or part of the same processing platform.

An exemplary process utilizing elements 112, 114 and 116 of an example circuit breaker pattern determination system 105 in computer network 100 will be described in more detail with reference to the flow diagram of FIG. 11.

Accordingly, at least one embodiment includes automatically determining candidates for circuit breaker patterns in cloud applications using machine learning techniques. Such an embodiment includes rendering one or more APIs more reliable by analyzing API service inputs and outputs, and providing API field-level predictions of likely candidates for at least one circuit breaker. As further detailed herein, one or more embodiments include leveraging technologies including microservice profiling and naïve Bayes classifiers.

As detailed above and further herein, one or more embodiments include collecting data. By way of example, such an embodiment can include collecting at least two sets of data by profiling at least one microservice. In such an embodiment, a first data set pertains to what the at least one microservice consumes (e.g., upstream dependent services), and such collected data in this set can include upstream service names, REST resource names, fields and the data for at least a portion of the requests for a given period of time. The collected data can then be labeled, for example, using the name of the corresponding upstream service. A second data set, in such an embodiment, pertains to what the at least one microservice produces in its own APIs, and such collected data in this set can include REST resource names, field names and data corresponding to a given period of time. In at least one embodiment, such data collection can be performed, for example, by intercepting at least a portion of the hypertext transfer protocol (HTTP) traffic in and out of the at least one microservice.

Using at least a portion of such collected data, at least one embodiment includes training one or more machine learning-based classifiers. For example, such an embodiment can include using data collected pertaining to what at least one microservice consumed to train a classifier. Because such data is labeled by the names of upstream services, the data can be transformed to training data for the classifier. As detailed herein, such a classifier can include a naïve Bayes classifier for multinomial models.

Subsequent to training a classifier, one or more embodiments include predicting API composition. For example, a classifier, trained on upstream data which at least one microservice has consumed, can be used to predict how one or more APIs are composed. In such an example embodiment, data collected pertaining to what the at least one microservice produces in its own APIs can be fed into the trained classifier to determine the composition of one or more given APIs. By way merely of illustration, such an embodiment can include determining, as best as possible, from where each field in a given API is sourced. If it is assumed, for instance, that a given API is a set of fields with values, then, to determine how this API is composed, one or more embodiments includes determining where each field's data values are coming from in terms of the upstream service name(s) and the field(s) from those service(s) that are used to create the API. By way of specific example, assume that there is an e-commerce application which has a view showing sales figures for all products. The application may use a single API to populate this view; however, this API could be composed from three upstream APIs, one API providing product details (e.g., name, model, etc.), another API providing product images, and another API providing sales information. Accordingly, at least one embodiment includes identifying how the single API used to populate the view is composed by determining which upstream service(s) (e.g., product service) and which field name(s) from the service(s) (e.g., product name) was used to create the API.

Subsequent to determining API composition of one or more APIs, at least one embodiment includes performing one or more automated actions such as, for example, informing at least one user of one or more candidates for the application of at least one circuit breaker pattern on one or more upstream dependent services. Such an embodiment can include generating and outputting a heat map, which provides visual indications of optimal candidates.

By way merely of illustration, FIG. 2 through FIG. 10C, as detailed further below, depict an example embodiment using data from a common update platform (CUP) product's APIs. In this example embodiment, data was collected from a REST microservice by means of one or more loggers and saved to individual j son files. Once the input and output data are collected from the microservice, at least a portion of such data is used to train a classifier which, when trained, can identify how the microservice's provided APIs are constructed. Such an embodiment can include creating a labeled data set wherein the labels are the names of the upstream service APIs from which the microservice consumed data. Such data can then be loaded into a dictionary (e.g., input_data) as shown in FIG. 2.

Figure 2:
FIG. 2 shows an example code snippet for processing input data in an illustrative embodiment.

FIG. 2 shows an example code snippet for processing input data in an illustrative embodiment. In this embodiment, example code snippet 200 is executed by or under the control of at least one processing system and/or device. For example, the example code snippet 200 may be viewed as comprising a portion of a software implementation of at least part of circuit breaker pattern determination system 105 of the FIG. 1 embodiment.

The example code snippet 200 illustrates loading collected data from consumed upstream services, grouping at least a portion of the data by service name, and storing the grouping in a variable called "input_data."

It is to be appreciated that this particular example code snippet shows just one example implementation of processing input data, and alternative implementations of such a process can be used in other embodiments.

Subsequent to processing input data, such as depicted in FIG. 2, at least one embodiment includes defining one or more helper functions to transform at least a portion of the data. Such an embodiment includes generating training data by flattening at least a portion of the input data down to a collection grouped by the service name of the dependent service. For example, for each service, the REST resource property names and data can be collected and ultimately used to train the classifier, as shown in FIG. 3.

FIG. 3 shows an example code snippet for transforming input data in an illustrative embodiment. In this embodiment, example code snippet 300 is executed by or under the control of at least one processing system and/or device. For example, the example code snippet 300 may be viewed as comprising a portion of a software implementation of at least part of circuit breaker pattern determination system 105 of the FIG. 1 embodiment.

The example code snippet 300 illustrates steps for preparing the data to be used to train a classifier. As detailed in example code snippet 300, the data are flattened and grouped by service prior to being used to train the classifier.

It is to be appreciated that this particular example code snippet shows just one example implementation of transforming input data, and alternative implementations of the process can be used in other embodiments.

Figure 4:
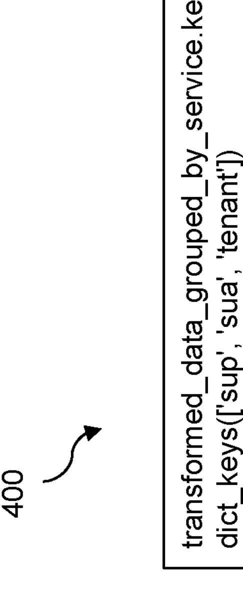
FIG. 4 shows an example code snippet for identification of groups of transformed data in an illustrative embodiment.

FIG. 4 shows an example code snippet for identification of groups of transformed data in an illustrative embodiment. In this embodiment, example code snippet 400 is executed by or under the control of at least one processing system and/or device. For example, the example code snippet 400 may be viewed as comprising a portion of a software implementation of at least part of circuit breaker pattern determination system 105 of the FIG. 1 embodiment.

The example code snippet 400 illustrates transformed data encompassing a collection of three dependent services (system-upgrade-api (sup), system-update-action (sua) and tenant-api (tenant)). Additionally, example code snippet 400 shows steps for debugging and/or confirming that grouping and flattening steps (such as detailed in connection with FIG. 3) worked. The example code snippet 400 includes a step for printing out a value to facilitate such verification.

It is to be appreciated that this particular example code snippet shows just one example implementation of identification of groups of transformed data, and alternative implementations of the process can be used in other embodiments.

FIG. 5 shows an example code snippet for implementing more granular identification of transformed data in an illustrative embodiment. In this embodiment, example code snippet 500 is executed by or under the control of at least one processing system and/or device. For example, the example code snippet 500 may be viewed as comprising a portion of a software implementation of at least part of circuit breaker pattern determination system 105 of the FIG. 1 embodiment.

The example code snippet 500 illustrates that the tenant service, as identified in FIG. 4, contains at least a portion of the data requested by the given microservice for one or more user details. Specifically, in example code snippet 500, the first two lines include printing the output to verify that the previous step worked. Namely, the code snippet 500 printed the text “Jake” and “xxx” so that it could be seen that the data collected from a service called ‘tenant’ were acceptable. The remainder of example code snippet 500 illustrates creating something referred to herein as a bunch from the transformed and/or flattened data, wherein the bunch is used to train a specific scikit learn classifier. It is to be noted, however, that other machine learning libraries could be used in connection with one or more embodiments, and that the bunch used in example code snippet 500 could be replaced with one or more other data formats that one or more particular classifiers require.

It is to be appreciated that this particular example code snippet shows just one example implementation of a more granular identification of transformed data, and alternative implementations of the process can be used in other embodiments.

FIG. 6 shows an example code snippet for training a classifier in an illustrative embodiment. In this embodiment, example code snippet 600 is executed by or under the control of at least one processing system and/or device. For example, the example code snippet 600 may be viewed as comprising a portion of a software implementation of at least part of circuit breaker pattern determination system 105 of the FIG. 1 embodiment.

The example code snippet 600 illustrates using labeled training data to train a multinomial naïve Bayes classifier. It is to be appreciated that this particular example code snippet shows just one example implementation of training a classifier, and alternative implementations of the process can be used in other embodiments. Specifically, example code snippet 600 shows training a classifier specific to the scikit learning library; it is noted that one or more embodiments can include similarly training other classifiers.

FIG. 7 shows an example code snippet for predicting the composition of one or more fields of an API in an illustrative embodiment. In this embodiment, example code snippet 700 is executed by or under the control of at least one processing system and/or device. For example, the example code snippet 700 may be viewed as comprising a portion of a software implementation of at least part of circuit breaker pattern determination system 105 of the FIG. 1 embodiment.

The example code snippet 700 illustrates testing the accuracy of a trained classifier (such as, for example, detailed in connection with FIG. 6) by predicting how some fields of a given API are composed. In the example illustrated in FIG. 7, the CUP application’s package API is used, and the trained classifier is able to correctly determine that this API is composed of three upstream APIs (i.e., sup, tenant and sua). The classifier is also able to determine the origin of fields that were transformed or aggregated by a given package API (e.g., the package API call that the given microservice provides). Additionally, the majority of the fields in the package API come from the upstream sup API, and the sua API is providing the least amount of data.

It is to be appreciated that this particular example code snippet shows just one example implementation of predicting the composition of one or more fields of an API, and alternative implementations of the process can be used in other embodiments. For instance, while example code snippet 700 (and other related descriptions herein) utilizes services called “sup,” “tenant” and “sua,” such services are merely used as illustrative examples and other use cases and/or embodiments can include using different services and/or service names in corresponding applications.

FIG. 8 shows an example code snippet for classifying testing data in an illustrative embodiment. In this embodiment, example code snippet 800 is executed by or under the control of at least one processing system and/or device. For example, the example code snippet 800 may be viewed as comprising a portion of a software implementation of at least part of circuit breaker pattern determination system 105 of the FIG. 1 embodiment.

The example code snippet 800 illustrates classifying at least a portion of the composition of one or more service APIs by processing testing data using a trained classifier (such as, for example, detailed in connection with FIG. 6). In such an embodiment, the testing data were not used in training the classifier. For example, in code snippet 800, the testing data include a packages API from a CUP-adapter service, which includes an aggregation of data from three upstream services. More specifically, example code snippet 800 includes looking at the data which the API provides, and saving at least a portion of such data into j son files (though it should be appreciated that other formats can be used by one or more embodiments based on particular data collection and storage mechanisms used). Once the data are loaded from the j son files, at least one embodiment includes introspecting the data field-by-field, passing the details to the trained classifier to obtain a prediction of how each field was composed (e.g., which upstream service the field came from and what field(s) from that service were used). The predictions are then saved into a variable called "field_stats," which can be inspected, as detailed in connection with FIG. 9.

It is to be appreciated that this particular example code snippet shows just one example implementation of classifying testing data, and alternative implementations of the process can be used in other embodiments.

FIG. 9 shows an example code snippet for generating a classification output in an illustrative embodiment. In this embodiment, example code snippet 900 is executed by or under the control of at least one processing system and/or device. For example, the example code snippet 900 may be viewed as comprising a portion of a software implementation of at least part of circuit breaker pattern determination system 105 of the FIG. 1 embodiment.

The example code snippet 900 illustrates generating a classification output pertaining to the classifying actions carried out in connection with FIG. 8. Such a classification output includes the three upstream services and the fields provided by those services. Accordingly, example code snippet 900 includes a text-only display for determining if the previous step (as illustrated in FIG. 8) worked. It is to be noted that while example code snippet 900 utilizes a text-only display, one or more embodiments can include using other types of display (e.g., a heat map). Accordingly, any such displays can be implemented to show a nested structure wherein the key is the name of the upstream service and the values are the field names of the API being inspected. For example, as illustrated in example code snippet 900, for the upstream service named "sup," 25 fields that the API produces are listed, and these 25 fields come from this "sup" service. It is to be appreciated that this particular example code snippet shows just one example implementation of generating a classification output, and alternative implementations of the process can be used in other embodiments.

Subsequent to such a classification, at least one embodiment can include performing one or more automated actions such as, for example, informing at least one user of the classification, generating a visualization of the classification, etc. As detailed in connection with FIG. 8 and FIG. 9, the given microservice in question with respect to the example embodiment is composed of three upstream APIs (i.e., sup, tenant and sua). The majority of the fields and data, as shown in FIG. 9, come from the sup API. However the sua API provides just one of the fields (e.g., approximately 3%) and even less of the actual data (e.g., approximately 1%). This indicates that the sua API may be a good candidate for at least one circuit breaker pattern.

FIG. 10A through FIG. 10C show example code snippets for generating a visualization output in an illustrative embodiment. In this embodiment, example code snippets 1000, 1001, and 1002 are executed by or under the control of at least one processing system and/or device. For example, the example code snippets 1000, 1001, and 1002 may be viewed as comprising one or more portions of a software implementation of at least part of circuit breaker pattern determination system 105 of the FIG. 1 embodiment.

The example code snippet 1000 of FIG. 10A illustrates a data enrichment step. The previous step depicted in FIG. 9 provided a field-by-field description of the API, showing where each field's data came from in terms of upstream service name(s). As such, example code snippet 1000 enriches this data by adding how many distinct values for each field are provided by the API. Accordingly, if a field's distribution of values is small relative to another field, then one or more embodiments can include determining that the field is less important and can be deemed a likely candidate for some sort of static data when a circuit breaker is applied.

The example code snippet 1001 of FIG. 10B illustrates printing and/or logging the result of the previous step depicted in FIG. 10A. For example, the line "releaseNoteLink sup 4" represents the field in the API called releaseNoteLink, and that the field comes from the sup service and has four distinct values. Accordingly, such printing and/or logging of these types of results facilitates depiction of what service is providing most of the data.

The example code snippet 1002 of FIG. 10C illustrates steps involved in generating a heat map to visualize classification outputs. Accordingly, in an example embodiment such as detailed in connection with FIG. 10C, a heat map can be generated and used to visually express the likely and/or optimal candidates for circuit breaker as outliers. Using a heat map generated, for example, based on data detailed in code snippet 1001, it can be seen that most of the data comes from the sup service. Also, three possible candidates for a circuit breaker can be identified from such a heat map, wherein such candidates are the outliers from the two services which provide the least data: publishing.info, which comes from the sua service (which is only providing this single field), publishedBy which comes from the tenant service, and createdBy, which comes from the tenant service.

In this example, the sua service provides just one of the 27 fields (~4%), the tenant service provides ~8% of the fields, and the sup service provides ~88% of the fields. Accordingly, in this example, it is most likely that replacing ~88% of the data with some sort of static fallback data would not be useful. Therefore, it can be determined that if the sup service becomes unavailable, it will render the API unavailable, and as such, the sup service is not a good candidate for a circuit breaker. However, if the ~4% of data from the sua service (field named publishing.info) can be seen as being not very important, then the API can still function if such data were replaced with some static fallback data and a circuit breaker applied.

Accordingly, one or more embodiments include looking for one or more upstream services that provide minimal data to a given API, and in such cases, determining if placeholder data can be used in connection with the corresponding fields, in the case of the upstream service(s) being unavailable.

A heat map is discussed above in connection with FIG. 10C as merely one example of visualizing classification results and/or outputs. It is to be appreciated that one or more embodiments can include implementing and/or generating one or more other types of visualizations (e.g., bar plots, pie charts, etc.).

It is to be appreciated that this particular example code snippet shows just one example implementation of generating a visualization output, and alternative implementations of the process can be used in other embodiments.

Figure 11:
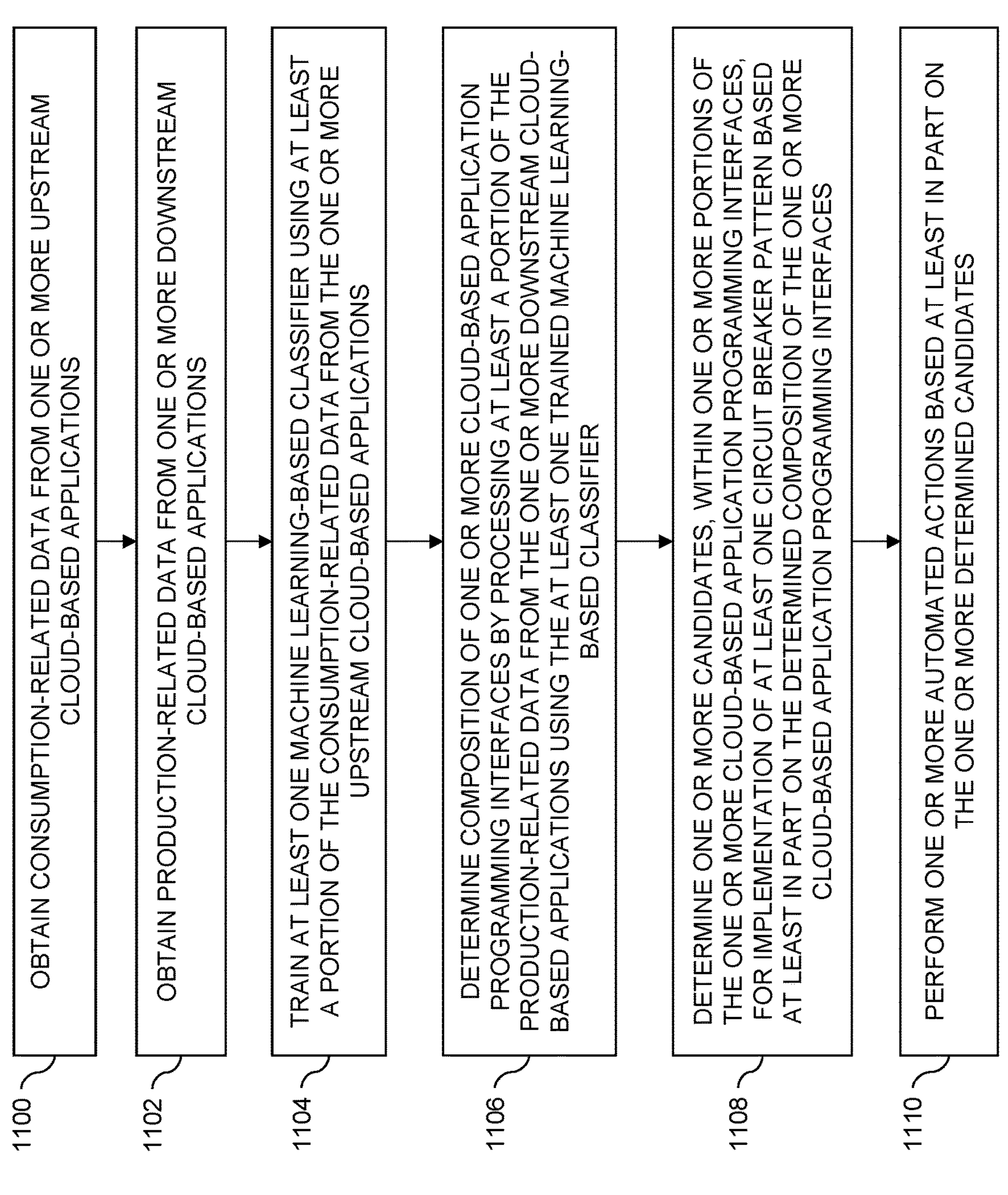
FIG. 11 is a flow diagram of a process for determining candidates for circuit breaker patterns in cloud applications using machine learning techniques in an illustrative embodiment.

FIG. 11 is a flow diagram of a process for determining candidates for circuit breaker patterns in cloud applications using machine learning techniques in an illustrative embodiment. It is to be understood that this particular process is only an example, and additional or alternative processes can be carried out in other embodiments.

In this embodiment, the process includes steps 1100 through 1110. These steps are assumed to be performed by the circuit breaker pattern determination system 105 utilizing elements 112, 114 and 116.

Step 1100 includes obtaining consumption-related data from one or more first cloud-based applications. In at least one embodiment, obtaining consumption-related data from one or more first cloud-based applications includes identifying at least one of one or more names attributed to the one or more first cloud-based applications, one or more representational state transfer resource names, and one or more fields and data corresponding thereto for one or more requests for a given period of time. Additionally, obtaining consumption-related data from one or more first cloud-based applications can include labeling at least a portion of the consumption-related data using a name of the corresponding first cloud-based application. Also, in one or more embodiments, obtaining consumption-related data from one or more first cloud-based applications includes obtaining the consumption-related data by intercepting hypertext transfer protocol traffic into the one or more first cloud-based applications.

Step 1102 includes obtaining production-related data from one or more second cloud-based applications. In at least one embodiment, obtaining production-related data from one or more second cloud-based applications includes obtaining data produced by the one or more second cloud-based application in one or more corresponding application programming interfaces. Also, obtaining production-related data from one or more second cloud-based applications can include identifying at least one of one or more representational state transfer resource names, and one or more fields and data corresponding thereto for one or more requests for a given period of time. Further, in one or more embodiments, obtaining production-related data from one or more second cloud-based applications includes obtaining the production-related data by intercepting hypertext transfer protocol traffic out of the one or more second cloud-based applications.

As detailed herein, in one or more embodiments, the one or more first cloud-based applications can include one or more upstream cloud-based applications, and the one or more second cloud-based applications can include one or more downstream cloud-based applications.

Step 1104 includes training at least one machine learning-based classifier using at least a portion of the consumption-related data from the one or more first cloud-based applications. In at least one embodiment, training at least one machine learning-based classifier includes training at least one multinomial naïve Bayes classifier using at least a portion of the consumption-related data from the one or more first cloud-based applications. Step 1106 includes determining composition of one or more cloud-based application programming interfaces by processing at least a portion of the production-related data from the one or more second cloud-based applications using the at least one trained machine learning-based classifier.

Step 1108 includes determining one or more candidates, within one or more portions of the one or more cloud-based application programming interfaces, for implementation of at least one circuit breaker pattern based at least in part on the determined composition of the one or more cloud-based application programming interfaces. In one or more embodiments, determining the one or more candidates includes identifying one or more low data volume fields among the one or more portions of the one or more cloud-based application programming interfaces, relative to other portions of the one or more cloud-based application programming interfaces.

Step 1110 includes performing one or more automated actions based at least in part on the one or more determined candidates. In at least one embodiment, performing the one or more automated actions includes implementing the at least one circuit breaker pattern in connection with at least one of the one or more determined candidates. Additionally or alternatively, performing the one or more automated actions can include outputting identifying information for the one or more determined candidates to at least one user and/or generating a visualization (e.g., a heat map, a bar plot, etc.) of the determined composition of the one or more cloud-based application programming interfaces, wherein the visualization highlights the one or more determined candidates.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine candidates for circuit breaker patterns in cloud applications using machine learning techniques. These and other embodiments can effectively overcome problems associated with time-consuming and resource-intensive reactive issue debugging processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
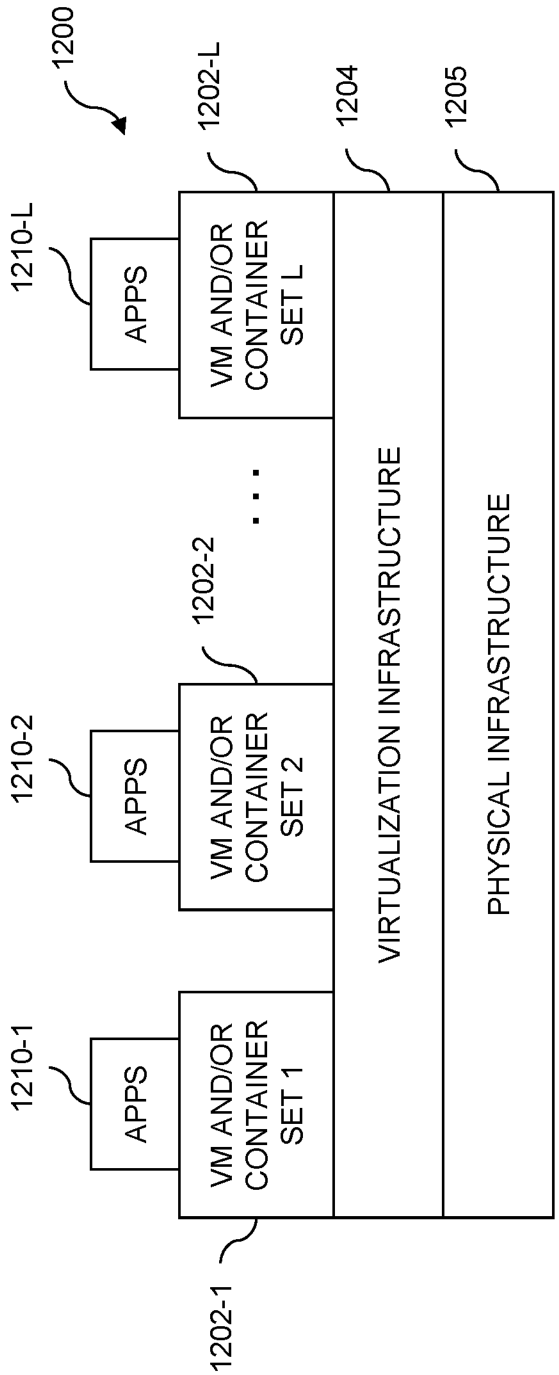
FIGS. 12 and 13 show examples of processing platforms that may be utilized to implement at least a portion of an information processing system in illustrative embodiments.
Figure 13:
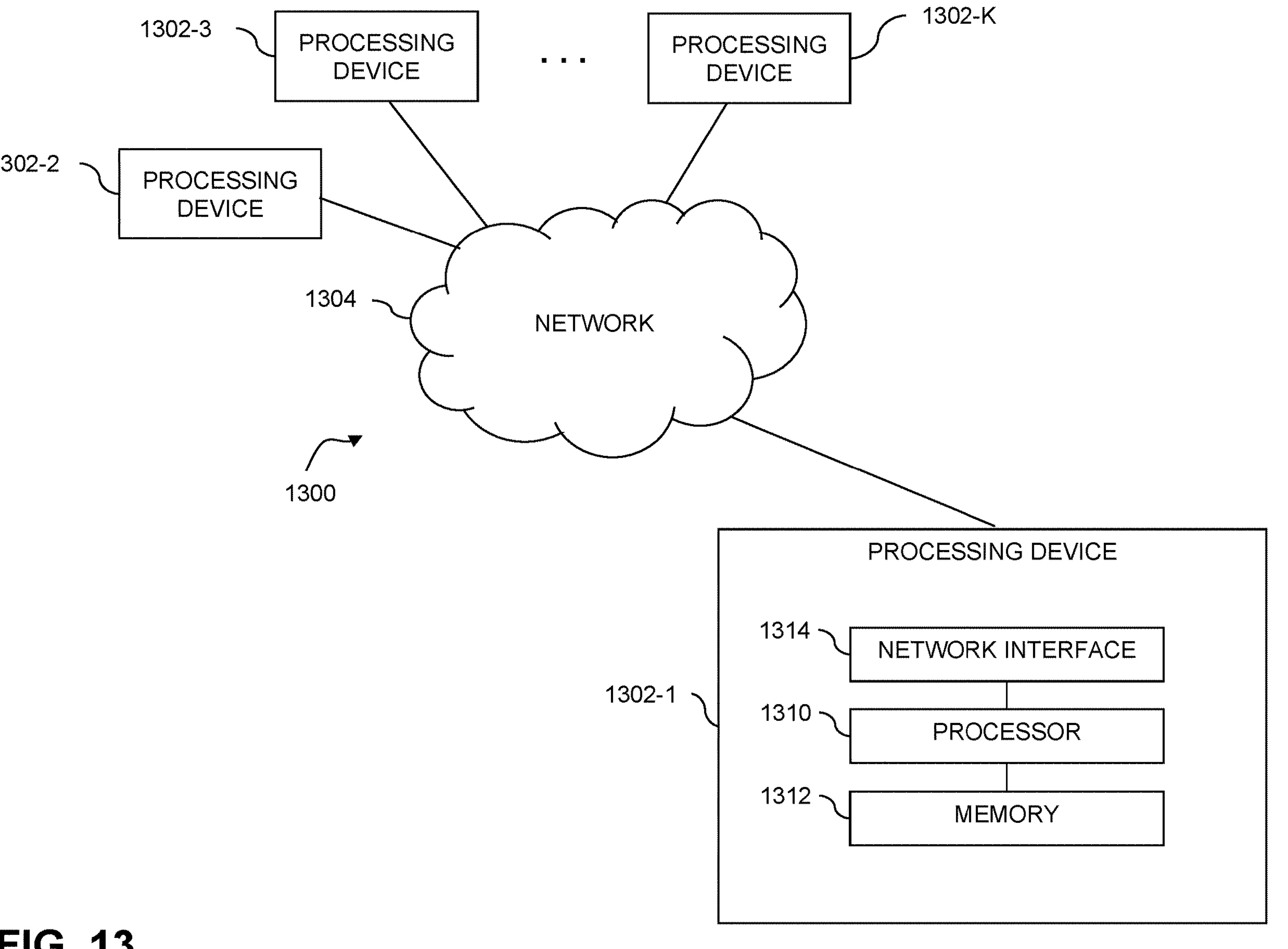

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a microcontroller, an application-specific integrated circuit (ASIC), a field-programmable gate array (FPGA) or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining consumption-related data from one or more first cloud-based applications by intercepting hypertext transfer protocol traffic into the one or more first cloud-based applications;

obtaining production-related data from one or more second cloud-based applications by intercepting hypertext transfer protocol traffic out of the one or more second cloud-based applications;

training at least one machine learning-based classifier using at least a portion of the consumption-related data from the one or more first cloud-based applications;

determining composition of cloud-based application programming interfaces by processing at least a portion of the production-related data from the one or more second cloud-based applications using the at least one trained machine learning-based classifier;

determining one or more candidate application programming interfaces, within one or more portions of the cloud-based application programming interfaces, for implementation of at least one circuit breaker pattern based at least in part on the determined composition of the cloud-based application programming interfaces, wherein the at least one circuit breaker pattern comprises at least one software program configured to implement fallback data in response to an unresponsive application programming interface; and performing one or more automated actions based at least in part on the one or more determined candidate application programming interfaces, wherein performing the one or more automated actions comprises implementing the at least one circuit breaker pattern in at least one of the one or more determined candidate application programming interfaces and replacing, within one or more fields of the one or more portions of the cloud-based application programming interfaces, data values produced by the at least candidate application programming interface with designated replacement data associated with the at least one circuit breaker pattern, wherein the designated replacement data comprises fallback data designated to be returned to a caller, at least in part via the at least one software program, upon activation of the at least one circuit breaker pattern;

wherein the method is performed by at least one processing device comprising a processor coupled to a memory.

2. The computer-implemented method of claim 1, wherein training at least one machine learning-based classifier comprises training at least one multinomial naïve Bayes classifier using at least a portion of the consumption-related data from the one or more first cloud-based applications.

3. The computer-implemented method of claim 1, wherein determining the one or more candidate application programming interfaces comprises identifying one or more low data volume fields among the one or more portions of the cloud-based application programming interfaces, relative to other portions of the cloud-based application programming interfaces.

4. The computer-implemented method of claim 1, wherein obtaining consumption-related data from one or more first cloud-based applications comprises identifying at least one of one or more names attributed to the one or more first cloud-based applications, one or more representational state transfer resource names, and one or more fields and data corresponding thereto for one or more requests for a given period of time.

5. The computer-implemented method of claim 1, wherein obtaining consumption-related data from one or more first cloud-based applications comprises labeling at least a portion of the consumption-related data using a name of the corresponding first cloud-based application.

6. The computer-implemented method of claim 1, wherein obtaining production-related data from one or more second cloud-based applications comprises obtaining data produced by the one or more second cloud-based application in one or more corresponding application programming interfaces.

7. The computer-implemented method of claim 1, wherein obtaining production-related data from one or more second cloud-based applications comprises identifying at least one of one or more representational state transfer resource names, and one or more fields and data corresponding thereto for one or more requests for a given period of time.

8. The computer-implemented method of claim 1, wherein performing the one or more automated actions comprises outputting identifying information for the one or more determined candidate application programming interfaces to at least one user.

9. The computer-implemented method of claim 1, wherein performing the one or more automated actions comprises generating a visualization of the determined composition of the cloud-based application programming interfaces, wherein the visualization highlights the one or more determined candidate application programming interfaces.

10. The computer-implemented method of claim 9, wherein generating the visualization comprises generating at least one of a heat map and a bar plot.

11. The computer-implemented method of claim 1, wherein the one or more first cloud-based applications comprise one or more upstream cloud-based applications, and the one or more second cloud-based applications comprise one or more downstream cloud-based applications.

12. The method of claim 1, wherein implementing the at least one circuit breaker pattern comprises triggering the replacing of the at least a portion of data produced by the at least candidate application programming interface with the replacement data upon a determination that at least one of the application programming interfaces, different from the at least candidate application programming interface, is unresponsive.

13. A non-transitory processor-readable storage medium having stored therein program code of one or more software programs, wherein the program code when executed by at least one processing device causes the at least one processing device:

to obtain consumption-related data from one or more first cloud-based applications by intercepting hypertext transfer protocol traffic into the one or more first cloud-based applications;

to obtain production-related data from one or more second cloud-based applications by intercepting hypertext transfer protocol traffic out of the one or more second cloud-based applications;

to train at least one machine learning-based classifier using at least a portion of the consumption-related data from the one or more first cloud-based applications;

to determine composition of cloud-based application programming interfaces by processing at least a portion of the production-related data from the one or more second cloud-based applications using the at least one trained machine learning-based classifier;

to determine one or more candidate application programming interfaces, within one or more portions of the cloud-based application programming interfaces, for implementation of at least one circuit breaker pattern based at least in part on the determined composition of the cloud-based application programming interfaces, wherein the at least one circuit breaker pattern comprises at least one software program configured to implement fallback data in response to an unresponsive application programming interface; and to perform one or more automated actions based at least in part on the one or more determined candidate application programming interfaces, wherein performing the one or more automated actions comprises implementing the at least one circuit breaker pattern in at least one of the one or more determined candidate application programming interfaces and replacing, within one or more fields of the one or more portions of the cloud-based application programming interfaces, data values produced by the at least candidate application programming interface with designated replacement data associated with the at least one circuit breaker pattern, wherein the designated replacement data comprises fallback data designated to be returned to a caller, at least in part via the at least one software program, upon activation of the at least one circuit breaker pattern.

14. The non-transitory processor-readable storage medium of claim 13, wherein training at least one machine learning-based classifier comprises training at least one multinomial naïve Bayes classifier using at least a portion of the consumption-related data from the one or more first cloud-based applications.

15. The non-transitory processor-readable storage medium of claim 13, wherein implementing the at least one circuit breaker pattern comprises triggering the replacing of the at least a portion of data produced by the at least candidate application programming interface with the replacement data upon a determination that at least one of the application programming interfaces, different from the at least candidate application programming interface, is unresponsive.

16. An apparatus comprising:

at least one processing device comprising a processor coupled to a memory;

the at least one processing device being configured:

to obtain consumption-related data from one or more first cloud-based applications by intercepting hypertext transfer protocol traffic into the one or more first cloud-based applications;

to obtain production-related data from one or more second cloud-based applications by intercepting hypertext transfer protocol traffic out of the one or more second cloud-based applications;

to train at least one machine learning-based classifier using at least a portion of the consumption-related data from the one or more first cloud-based applications;

to determine composition of cloud-based application programming interfaces by processing at least a portion of the production-related data from the one or more second cloud-based applications using the at least one trained machine learning-based classifier;

to determine one or more candidate application programming interfaces, within one or more portions of the cloud-based application programming interfaces, for implementation of at least one circuit breaker pattern based at least in part on the determined composition of the cloud-based application programming interfaces, wherein the at least one circuit breaker pattern comprises at least one software program configured to implement fallback data in response to an unresponsive application programming interface; and to perform one or more automated actions based at least in part on the one or more determined candidate application programming interfaces, wherein performing the one or more automated actions comprises implementing the at least one circuit breaker pattern in at least one of the one or more determined candidate application programming interfaces and replacing, within one or more fields of the one or more portions of the cloud-based application programming interfaces, data values produced by the at least candidate application programming interface with designated replacement data associated with the at least one circuit breaker pattern, wherein the designated replacement data comprises fallback data designated to be returned to a caller, at least in part via the at least one software program, upon activation of the at least one circuit breaker pattern.

17. The apparatus of claim 16, wherein training at least one machine learning-based classifier comprises training at least one multinomial naïve Bayes classifier using at least a portion of the consumption-related data from the one or more first cloud-based applications.

18. The apparatus of claim 16, wherein implementing the at least one circuit breaker pattern comprises triggering the replacing of the at least a portion of data produced by the at least candidate application programming interface with the replacement data upon a determination that at least one of the application programming interfaces, different from the at least candidate application programming interface, is unresponsive.

19. The apparatus of claim 16, wherein performing the one or more automated actions comprises outputting identifying information for the one or more determined candidate application programming interfaces to at least one user.

20. The apparatus of claim 16, wherein performing the one or more automated actions comprises generating a visualization of the determined composition of the cloud-based application programming interfaces, wherein the visualization highlights the one or more determined candidate application programming interfaces.

* * * * *